Oct. 15, 1946.   V. K. ZWORYKIN ET AL   2,409,462
RADIO GUNFIRE CONTROL
Filed May 31, 1941
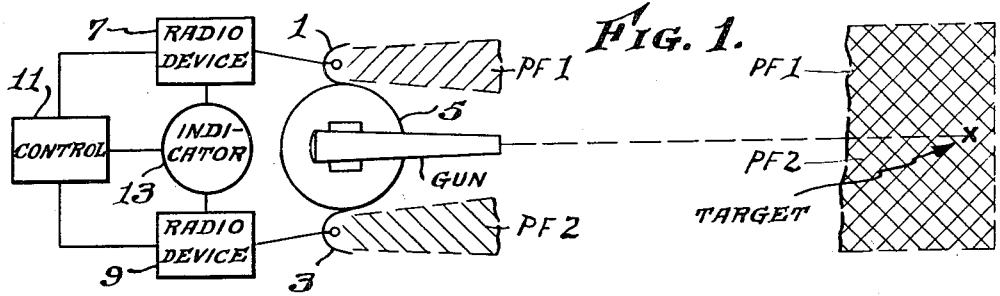
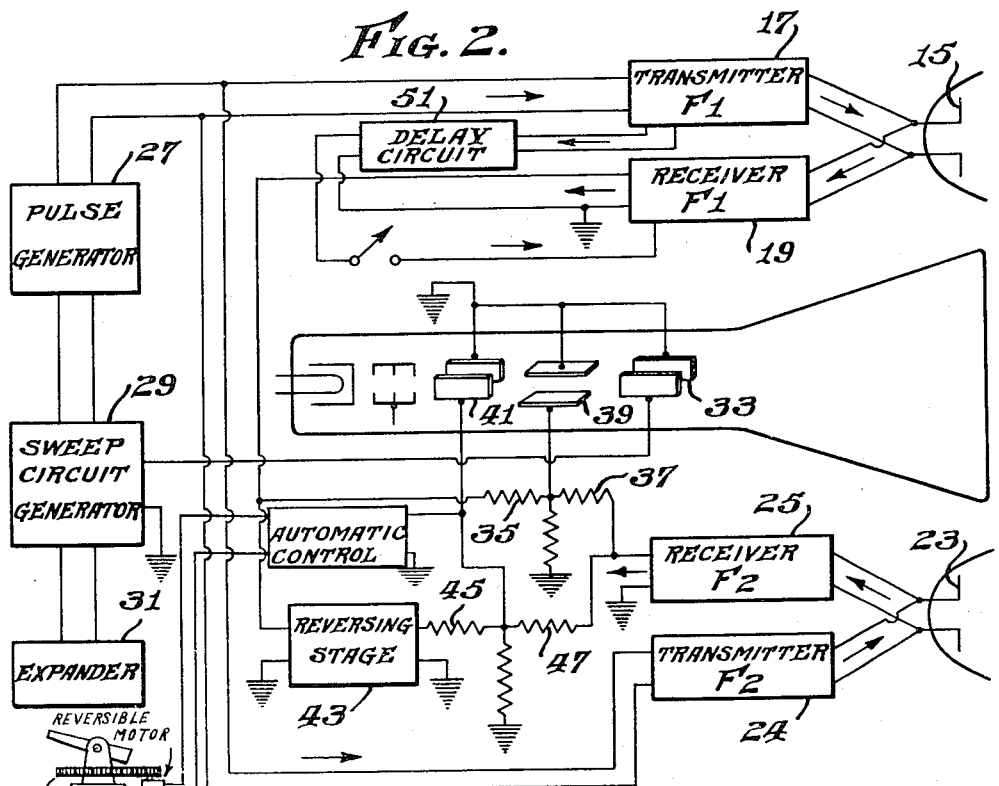
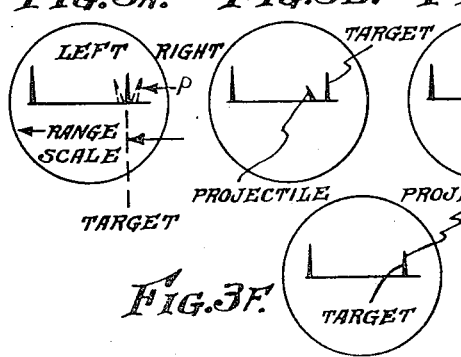
Inventors
Vladimir K. Zworykin
& Arthur W. Vance
Attorney Patented Oct. 15, 1946

2,409,462

UNITED STATES PATENT OFFICE 2,409,462

RADIO GUNFIRE CONTROL

Vladimir K. Zworykin, Philadelphia, Pa., and Arthur W. Vance, Haddonfield, N. J., assignors to Radio Corporation of America, a corporation of Delaware Application May 31, 1941, Serial No. 395,998

10 Claims. (Cl. 89—41)

This invention relates to improvements in gunfire control and particularly to an improved pulse radio system for controlling gunfire.

Radio pulse echo systems are used to locate objects and to indicate their distance. It is practical to use such systems in place of optical range finders for gunfire control. One great advantage is that radio range finders may be used when low visibility prevents the use of optical range finders. While radio ranging may be substituted for optical range finding, it should be understood that a high degree of accuracy is required for aiming a gun, and it is doubtful if a target may be located with sufficient accuracy for aiming a gun by means including a conventional radio pulse echo system.

It is one of the objects of the instant invention to provide an improved means for controlling gunfire by a radio pulse system and especially a system in which a high degree of accuracy is not required because the shell burst and the target are indicated simultaneously so that relative rather than absolute accuracy is used. Another object is to provide means whereby gunfire may be controlled by comparing a radio indication of the target to a radio indication of the shell burst. An additional object is to provide radio vision means for indicating a target and for indicating the position of a shell landing near or bursting near the target whereby a bracket may be established about an invisible target.

The invention will be described by referring to the accompanying drawing in which Figure 1 is a schematic diagram of one embodiment of the invention; Figure 2 is a block diagram of the radio pulse and indicator system; and Figures 3A to 3F inclusive are illustrations of the various bracket indications used in gunfire control according to the invention.

Referring to Figure 1, a pair of directive radiators 1, 3 are mounted on the gun turret 5 and preferably secured thereto so that they may be moved in synchronism with a gun turret 5. The radiators 1, 3, which are directive, are oriented so that their radiation patterns PF1, PF2 lie nearly parallel to the line of fire but converge sufficiently to overlap at the target, as indicated by the separate cross-hatching and overlapping cross-hatching. The radiators 1, 3 are connected to radio devices 7, 9 which are in turn connected to a control 11, and to a cathode ray tube indicator 13. The radio devices and indicator may be located at any convenient distance from the gun and connected by transmission lines to the radiators. The details of the circuit connections and elements will be hereinafter described by referring to Figure 2.

The method of operation is as follows: Distinctive pulses F1 and F2 of radio frequency energy are radiated by the radiators 1, 3 to form overlapping patterns PF1 and PF2. The region of equal field strength is arranged to coincide with the normal trajectory of shells fired from the gun. The outgoing pulses are reflected by the target. The reflected pulses are received and applied to the indicator. The indicator shows initially two things; first, the range of the target, and, second, whether the target is to the right or left of the normal trajectory. This information is obtained, as will hereinafter be explained, by observing the relative amplitudes of the pulses reflected by the target along the two patterns PF1 and PF2.

The gun is elevated to correspond to the indicated range and the turret and directive radiators are synchronously rotated until the cathode ray tube indications show that the gun is centered on the target. The nature of the centering indications are shown in Figure 3A. The sharply defined pulse P indicates the range or distance of the target and the tilting of the pulse indicates that the region of equal signal strength of the patterns PF1, PF2 is not centered on the target. When the patterns are properly centered, the pulse will be perpendicular to the range scale.

After the gun has been thus directed, the directive radio devices are preferably locked in position and a shell is fired. The effects accompanying the shell hit, the bursting of the shell, or its splash if fired into the sea, (if within the region of either or both of said radiation patterns) will cause the radio pulses to be reflected. The reflections will be indicated as to left or right or short or over the target, depending upon the position of the burst with respect to the target. The possible indications are as follows: Figure 3B short and left; Figure 3C short and right; Figure 3D over and left; Figure 3E over and right; and Figure 3F on the target. For any particular indication, the gun is "overcorrected" and additional shots fired until a bracket is established according to conventional gunfire methods. The bracket is indicated visually as functions of the propagation time and relative amplitudes of the pulses reflected by the shell effect in its final position.

One embodiment of the radio pulse echo apparatus is shown in Figure 2. A first directive radiator 15, which may include a reflector or an antenna array, is connected to a transmitter 17 and a receiver 19 operating on a pulse carrier frequency F1. A second directive radiator 23, arranged like the first radiator 15, is connected to a second transmitter 24 and a second receiver 25. The transmitters 17 and 24 are controlled by a pulse generator 27 which is connected to a sweep generator 29 so that the outgoing pulses are synchronized with the zero of the sweep or range scale. The sweep generator 29 may include an expander 31 which expands the scale in the range immediately including the target. The sweep generator 29 is connected to horizontal deflecting electrodes 33.

The outputs of the receivers 19 and 25 are connected through isolating resistors 35, 37 to a pair of vertical deflecting electrodes 39 so that the combined outputs deflect the cathode ray vertically to indicate the ranges of the target and shell burst. The left-right indications are obtained by applying to a third set of electrodes 41 (arranged for horizontal deflections) the differences in the outputs of the receivers. The difference output is obtained by reversing the output of one receiver by appropriate means, such as a reversing stage 43. The output of the reversing stage and the second receiver 23 are applied in opposite phases through isolating resistors 45 and 47 to the deflecting electrodes 41.

Thus, the currents or voltages corresponding to the reflected pulses add to deflect vertically and oppose each other to deflect horizontally. If the opposing currents are equal, no horizontal deflection is produced by the echo pulses. This indicates that the target is in the region of equal signal strength. If, however, the target is to the left or right of the equal signal strength region, the reflected pulse signals will be unequal and therefore a horizontal deflecting force will be applied at the same time the vertical deflecting force is applied so that the resulting deflection will be at an angle indicating the target position as described in connection with Figures 3B to 3E.

While most of the elements of the foregoing circuit are well known to those skilled in the art, reference is made to the following: Copending application, Serial No. 184,354, filed January 11, 1938, by Wolff and Hershberger, which discloses a preferred method of coupling the receiver and transmitter to a common antenna. One form of pulse generator is described in a copending application Serial No. 182,418, filed December 30, 1937, by Irving Wolff. A sweep generator expander circuit is shown in copending application Serial No. 270,123, filed April 26, 1939, by Irving Wolff. The transmitters and receivers do not require any detailed description. The reversing stage may be a simple resistance coupled thermionic tube biased for zero gain. With respect to both transmitters and receivers, it is important that the power output and receiver sensitivity be equal and respectively unvarying in the two channels because any change in either channel will alter its field or response pattern. It is desirable to mount the radio devices and indicator as far as possible from the gun so that the devices will not be responsive to the compressional waves due to the firing.

It should be understood that the voltages applied to the deflecting electrodes 41 may be also applied, through suitable known control circuits, to the motor 48 or motors which orient the gun turret in the azimuth. In such an arrangement it is necessary to eliminate from the receiver all echo pulse signals except those signals which are reflected from the range corresponding to the target. This may be done by deriving from the outgoing pulses, or from the transmitter, a pulse, which is delayed by a delay or filter network 51. The delayed pulse is applied at the proper time or proper phase to unblock the receiver, which may be normally blocked. The blocking and unblocking may be accomplished by including in the receiver a biased off amplifier, or a balanced modulator, which is keyed on at the proper time by the delayed pulse. While delay circuits are known, reference is made to the copending application, Serial No. 395,321, filed May 26, 1941, by Samuel Tucker, for an improvement in Pulse echo receivers. The balanced modulator is disclosed in copending application Serial No. 395,924, filed May 31, 1941, by George M. Charrier, for an improvement in Obstacle detector recognition system. While the directive radiators have been illustrated as mounted on the gun turret, the radiators may be mounted at a remote point such as a mast and may be rotated by means of synchronous motors so that the turret and the radiators assume automatically the same angular position for the initial direction of the gun. One suitable remote control system is disclosed in Alexanderson U. S. Patent 1,554,698, in which the telescope 2 may be replaced with applicants' gun 5 and the searchlight 1 may be replaced with applicants' radiators 1, 3.

Thus, the invention has been described as an improved system of gunfire control. The target range and angular position from the gun are indicated by a radio pulse system. The range and angular position of the bursting shell are indicated in a like manner on the same indicator. It should be understood that separate indicators may be used for range and angular position, respectively. The gunfire is directed so that the target indication and the shell indication coincide or the firing may be arranged to bracket the target. Thereafter, all the guns of a battery may be fired in accordance with the conventional practice. In this system of indication, it is not necessary that the target be visible because the radio pulses will penetrate smoke, fog, or clouds, and will be reflected by the target. Inasmuch as the gunfire is directed by comparison of the target radio indication and hit or shell burst radio indication, no great accuracy of measurement of range or angle is required. In order that such comparison be made accurately, it is preferable to expand the scale in the region of the indicitions.

We claim as our invention:

1. The method of directing gunfire which includes directing pulses of energy at a target and including a region about the target within which shells directed at the target fall, receiving the pulses reflected from said target, indicating by means of said pulses the range and angular position of the target with respect to the gun to be directed; firing into said region a shell from said gun; and observing the pulses, reflected from the effects of said shell at its final position within said region, to determine said final shell position with respect to the pulse indicated target position.

2. The method of directing gunfire which includes directing pulses of energy toward a target and including a region about the target within which shells directed at the target fall, receiving the pulses reflected from said target; indicating visually by means including said reflected pulses the range and angular position of the target with respect to the gun to be directed; firing into said region a shell toward said target; and producing visual indication of the pulses reflected from the explosive effects of said shell within said region, the range and position of said explosive effects with respect to the visually produced indications of said target.

3. The method of directing gunfire which includes directing pulses of energy toward a target and including a region about the target within which shells directed at the target fall; receiving the pulses reflected from said target; indicating visually as functions of said reflected pulses the range and the angular position of said target with respect to the gun to be directed; firing into said region a shell toward said target; receiving the pulses reflected by the effect of said shell within said region; and indicating visually, as functions of the received pulses reflected from shell effect, the range and the angular position of said shell effect with respect to the said visually indicated target.

4. The method of directing gunfire which includes directing pulses of energy in two overlapping channels toward a target and including a region about the target within which shells directed at the target fall; receiving the pulses reflected from said target; indicating visually the range of said target as a function of pulse propagation time and the angular position of said target as a function of the difference in strength of the pulses propagated over said two channels; firing into said region a shell from the gun to be directed; indicating the range and angular position of the final position of the shell within said region by observing the pulses reflected from said final position to indicate visually said final position with respect to said visual indications of said target.

5. The method of directing gunfire which includes directing pulses of energy in two channels toward a target and including a region about the target within which shells directed at the target fall; receiving the pulses reflected from said target; indicating visually the range of said target as a function of the pulse propagation time and the angular position of said target as a function of the relative strength of the pulses propagated over said two channels; firing into said region a shell from the gun to be directed; and indicating the shell range as a function of the time of propagation of the pulses reflected from the shell hit within said region and the angular position as a function of the relative strength of the pulses received from said two channels by reflection from the region of said hit.

6. The method of directing gunfire which includes directing pulses of radio frequency energy in two overlapping channels toward a target and including a region about the target within which shells directed at the target fall; receiving the pulses reflected from said target; indicating visually the range of said target as a function of the pulse propagation time and the angular position of said target as a function of the relative strength of the pulses propagated over said two channels; firing into said region a shell from the gun to be directed; and indicating the shell range as a function of the time of propagation of the pulses reflected from the shell hit within said region and the angular position as a function of the relative strength of the pulses received from said two channels by reflection from the region of said hit.

7. The method of directing gunfire which includes directing pulses of radio frequency energy in two overlapping channels toward a target and including a region about the target within which shells directed at the target fall; receiving the pulses reflected from said target; indicating visually the range of said target as a function of the pulse propagation time and the angular position of said target as a function of the relative strength of the pulses propagated over said two channels; firing into said region a shell from the gun to be directed; and indicating the range and angular position of the shell burst within said region as a function of the propagation time of the pulses reflected from the shell burst and as a function of the relative signal strengths of the pulses propagated over said two channels respectively.

8. The method of directing gunfire which includes radiating pulses of energy in overlapping fields toward a target and including a region about the target within which shells directed at the target fall; receiving said pulses after reflection from said target; indicating the range of the target as a function of the propagation times of said reflected pulses, indicating the angular position as a function of the difference in amplitude of the reflected pulses in said overlapping fields, firing a shell into said region, and indicating its final position by said pulses reflected from the disturbance of said shell at its final position within said region in range and angular position by comparison with said target indications.

9. The method set forth in claim 1 including the additional steps of deriving controlling currents from the pulses reflected from the effect of the shell at its final position, and applying said controlling currents to orient said gun as a function of the amplitudes of said pulses reflected from said shell effect.

10. The method set forth in claim 5 including the additional steps of deriving controlling currents corresponding to the difference in the relative strengths of the pulses received over said channels after reflection from the hitting shell, and applying said controlling currents to orient said gun.

VLADIMIR K. ZWORYKIN.
ARTHUR W. VANCE.